US012642752B2

(12) United States Patent
Besser et al.

(10) Patent No.: US 12,642,752 B2
(45) **Date of Patent: *Jun. 2, 2026**

(54) FEEDING TUBE WITH ELECTROMAGNETIC SENSOR AND CAMERA

(71) Applicant: ENVUE MEDICAL HOLDINGS, CORP., Arlington Heights, IL (US)

(72) Inventors: Doron Besser, Tel Aviv (IL); Tiran Spierer, Hod Hasharon (IL); Zenya Gorlik, Oranit (IL); Gabi Shapiro, Raanana (IL); Ilan Shier, Binyamina (IL); Anat Hofshi, Tel Aviv (IL); Guy Ben Ezra, Karkur (IL)

(73) Assignee: ENVUE MEDICAL HOLDINGS, CORP., Arlington Heights, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,059

(22) Filed: May 18, 2023

(65) Prior Publication Data

US 2023/0285249 A1 Sep. 14, 2023

Related U.S. Application Data

(60) Continuation-in-part of application No. 18/099,112, filed on Jan. 19, 2023, now Pat. No. 11,766,385, (Continued)

(51) Int. Cl.
*A61J 15/00* (2006.01)

(52) U.S. Cl.
CPC ....... *A61J 15/0088* (2015.05); *A61J 15/0003* (2013.01); *A61J 15/0015* (2013.01); (Continued)

(58) Field of Classification Search
CPC ................ A61J 15/0088; A61J 15/0003; A61J 15/0015; A61J 15/0011; A61J 15/0069
See application file for complete search history.

(56) References Cited

U.S. PATENT DOCUMENTS

| | | | |
|---|---|---|---|
| 10,993,887 | B2 | 5/2021 | Besser et al. |
| 2008/0255446 | A1 | 10/2008 | Akins |

(Continued)

FOREIGN PATENT DOCUMENTS

| | | | |
|---|---|---|---|
| CN | 103549952 | A | 2/2014 |
| CN | 103930024 | A | 7/2014 |

(Continued)

OTHER PUBLICATIONS

English Summary of Office Action issued on Jan. 29, 2021 in Chinese Patent Application No. 201811462390.9.

(Continued)

*Primary Examiner* — Dung T Ulsh
(74) *Attorney, Agent, or Firm* — The Roy Gross Law Firm, LLC; Roy D. Gross

(57) ABSTRACT

There is provided feeding tubes including an electromagnetic sensor including a sensor body comprising a core positioned at a distal end of the sensor lumen, and a wire extending along the length of the feeding tube, wherein an RF induced heating of the feeding tube in an MRI environment is below 5 degrees.

18 Claims, 8 Drawing Sheets

Related U.S. Application Data which is a continuation of application No. 17/221,365, filed on Apr. 2, 2021, now Pat. No. 11,559,470, which is a division of application No. 16/208,040, filed on Dec. 3, 2018, now Pat. No. 10,993,887.

(60) Provisional application No. 62/594,000, filed on Dec. 3, 2017.

(52) U.S. Cl.
CPC ....... *A61J 15/0073* (2013.01); *A61J 15/0092* (2013.01); *A61J 15/0011* (2013.01); *A61J 15/0069* (2013.01)

(56) References Cited

U.S. PATENT DOCUMENTS

| | | | | |
|---|---|---|---|---|
| 2008/0275395 | A1* | 11/2008 | Asbury | A61L 29/18 604/113 |
| 2010/0030133 | A1* | 2/2010 | Elia | A61B 5/4836 604/35 |
| 2010/0041949 | A1* | 2/2010 | Tolkowsky | A61B 5/742 600/117 |
| 2011/0130750 | A1* | 6/2011 | Ormsby | A61B 18/1815 606/33 |
| 2012/0116393 | A1 | 5/2012 | Jimenez et al. | |
| 2012/0137513 | A1 | 6/2012 | Lloyd et al. | |
| 2012/0323089 | A1 | 12/2012 | Feer et al. | |
| 2014/0005517 | A1 | 1/2014 | Nagarkar et al. | |
| 2014/0180252 | A1* | 6/2014 | Gabriel | A61J 15/0007 604/99.04 |
| 2015/0174013 | A1 | 6/2015 | Besser et al. | |
| 2015/0342836 | A1* | 12/2015 | Allyn | A61B 1/005 600/109 |
| 2015/0366761 | A1* | 12/2015 | Phillips | A61M 25/0009 604/175 |
| 2017/0020396 | A1 | 1/2017 | Boone et al. | |
| 2017/0074920 | A1* | 3/2017 | Di Stefano | G01R 29/12 |
| 2018/0049950 | A1* | 2/2018 | Besser | A61M 5/142 |
| 2018/0078195 | A1* | 3/2018 | Sutaria | A61B 7/003 |
| 2019/0015166 | A1 | 1/2019 | Mahoney et al. | |
| 2021/0220228 | A1 | 7/2021 | Besser et al. | |

FOREIGN PATENT DOCUMENTS

| | | | |
|---|---|---|---|
| EP | 0334086 | A2 | 9/1989 |
| JP | 2008-264533 | A | 11/2008 |
| JP | 2012-508640 | A | 4/2012 |
| JP | 2013-505793 | A | 2/2013 |
| JP | 2013-521040 | A | 6/2013 |
| JP | 2015-523145 | A | 8/2015 |
| WO | 2010/055453 | A1 | 5/2010 |
| WO | 2011/038330 | A1 | 3/2011 |
| WO | 2011/092701 | A1 | 8/2011 |
| WO | 2011/107894 | A1 | 9/2011 |
| WO | 2013/038354 | A1 | 3/2013 |
| WO | 2014/003960 | A1 | 1/2014 |

OTHER PUBLICATIONS

English translation of Office Action issued in Japanese Patent Application No. 2018-214982 dispatched on Jan. 28, 2020.
English Translation of Office Action issued in Japanese Patent Application No. 2018-214982 on Aug. 25, 2020.
Examiner Interview Summary Record (PTOL-413) Mailed on Sep. 23, 2022 for U.S. Appl. No. 17/221,365.
Extended European Search Report issued in European patent application No. 18209166.0, 7 pp,, dated May 23, 2019.
Greatbatch et al. Magnetic Resonance Safety Testing of a Newly Developed Fiber optic Cardiac Pacing Lead (2002).
Hess et al. Safety of intraterine contraceptive devices during MR imaging (1996).
Non-Final Rejection Mailed on May 19, 2020 for U.S. Appl. No. 16/208,040.
Non-Final Rejection received for U.S. Appl. No. 16/208,040, mailed on Feb. 6, 2019, 19 pages.
Notice of Allowance and Fees Due (PTOL-85) Mailed on Dec. 14, 2020 for U.S. Appl. No. 16/208,040.
Notice of Allowance and Fees Due (PTOL-85) Mailed on Feb. 24, 2021 for U.S. Appl. No. 16/208,040.
Notice of Allowance and Fees Due (PTOL-85) Mailed on Mar. 17, 2021 for U.S. Appl. No. 16/208,040.
Notice of Allowance and Fees Due (PTOL-85) Mailed on Sep. 23, 2022 for U.S. Appl. No. 17/221,365.
Shellock Metallic Surgical Instruments for Interventional MRI Procedures Evaluation of MR Safety (2001).
UCSF Relative contraindications (Oct. 30, 2016).
Examiner Interiew Summary Record (PTOL-413) Mailed on May 16, 2023 for U.S. Appl. No. 18/099,112, 1 page(s).
Notice of Allowance and Fees Due (PTOL-85) Mailed on May 16, 2023 for U.S. Appl. No. 18/099,112, 7 page(s).

* cited by examiner

FEEDING TUBE WITH ELECTROMAGNETIC SENSOR AND CAMERA

CROSS-REFERENCE TO RELATED APPLICATIONS

This application is a continuation-in-part of U.S. patent application Ser. No. 18/099,112, filed on Jan. 19, 2023, which is continuation of U.S. patent application Ser. No. 17/221,365, filed on Apr. 2, 2021, which is a divisional of U.S. patent application Ser. No. 16/208,040, filed on Dec. 3, 2018, now U.S. Pat. No. 10,993,887, which claims the benefit of U.S. Provisional Patent Application No. 62/594,000, filed on Dec. 3, 2017, the disclosures of which are incorporated herein by reference in their entirety.

TECHNOLOGICAL FIELD

Embodiments of the disclosure relate to insertion tubes, inter alia feeding tubes with electromagnetic sensors and cameras for positioning guidance.

BACKGROUND

Enteral feeding is often used as nutritional support in patients unable to be fed otherwise. Although many benefits are associated with early initiation of enteral feeding, misplacement of feeding tubes is relatively common and can result in patient discomfort and complications. Confirming the position of the tube only after it is already inserted delays the feeding and the initiating of hydration or medication. Similarly, due to patient movement and/or medical procedures performed, reconfirmation of feeding tube position may often be desired.

There is therefore a need, for feeding tubes including a sensor enabling reliable real-time tracking during positioning as well as tube position confirmation of an already inserted tube.

SUMMARY

The following embodiments and aspects thereof are described and illustrated in conjunction with systems, tools and methods, which are meant to be exemplary and illustrative, not limiting in scope.

One of the problems often associated with insertion of a feeding tube using an electromagnetic positioning guidance system, is that reliability is difficult to obtain in the patient environment, which is typically dynamic. For example, the patient's chest often moves during insertion of a feeding tube (for example due to coughing), resulting in a movement of sensors positioned on the patient's chest and thus changing the reference point thereof. Similarly, movement of the patient's bed or its position (e.g. flat versus sitting) may likewise cause changes when inserting a feeding tube.

The feeding tube disclosed herein advantageously includes a passive electromagnetic sensor at its distal tip, which sensor enables monitoring of the feeding tube position and/or path, when subject to an electromagnetic field generator, external to the patient's body.

Advantageously, since the sensor included in the tube is passive, i.e. does not transmit an electromagnetic field, a field generator external to the patient's body is utilized. Accordingly, a larger electromagnetic field may be generated, which is less sensitive to movements and therefore provides more reliable coordinates of the tube's position. Such coordinates are critical for real-time monitoring of feeding tube positioning including early detection of incorrect insertion into the patient's lungs rather than the stomach.

Advantageously, the feeding tube, including the electromagnetic sensor, as disclosed herein, exhibits a very low RF induced heating during MRI. Accordingly, the electromagnetic sensor be formed as an integral part of the feeding tube, and does not need to be withdrawn for performing MRI procedures, to the convenience of both patients and caregivers. This as opposed to other electromagnetic sensors/transmitters, which due to their RF induced heating must be taken out (either sensor or entire tube) prior to performing an MRI scan, in order to prevent internal damage being caused to the patient. This further obviates the need for reinsertion (if the position of the feeding tube needs be verified), thereby enabling confirming the position of the feeding tube without reintroducing the sensor, which re-introduction may be hazardous.

In addition, the herein disclosed tube is flexible, having a low butt force (N) value, yet may advantageously be inserted without requiring the use of a guide wire.

According to some embodiments, there is provided a feeding tube including a feeding lumen for supplying substances or pressure to a subject's stomach and/or duodenum, through the esophagus; and a sensor lumen, the sensor lumen comprising an electromagnetic sensor. The electromagnetic sensor includes a sensor body including a core positioned at a distal end of the sensor lumen, and a wire extending along the length of the sensor lumen. According to some embodiments, an RF induced heating of the feeding tube in an MRI environment is below 5 degrees.

According to some embodiments, the electromagnetic sensor body further includes a printed circuit board (PCB). According to some embodiments, the sensor core and the wire are directly or indirectly attached to the PCB. According to some embodiments, the PCB is a FR-4 PCB.

According to some embodiments, the wire is twisted. According to some embodiments, the twisted wire includes two intercalated wires.

According to some embodiments, the RF induced heating of the feeding tube in an MRI environment is below 3 degrees. According to some embodiments, the RF induced heating of the feeding tube in an MRI environment is below 2 degrees. According to some embodiments, the RF induced heating of the feeding tube in an MRI environment is below 1.5 degrees.

According to some embodiments, the feeding tube has a butt force (N) in the range of 0.2-0.5 N.

According to some embodiments, the feeding tube is at least 900 mm long. According to some embodiments, the feeding tube has a length of 900-1400 mm.

According to some embodiments, the feeding tube includes a radiopaque marker.

According to some embodiments, the twisted wire has an outer diameter of 0.5 mm or less. According to some embodiments, the twisted wire has an outer diameter of 0.4 mm or less. According to some embodiments, the sensor body has an outer diameter of 1 mm or less.

According to some embodiments, the feeding tube further includes at least one camera. According to some embodiments, the camera is positioned at the distal end of the feeding tube. According to some embodiments, the camera is configured to image the path of the insertion tube during insertion. According to some embodiments, the camera is configured to image the target environment after positioning of the tube. According to some embodiments, the camera may be functionally associated with the PCB.

According to some embodiments, the feeding tube includes at least four vacuum lumens peripherally surrounding the feeding lumen and the sensor lumen. According to some embodiments. According to some embodiments, each of the at least four vacuum lumen includes a vacuum sealing portion, the vacuum sealing portion having one or more suction ports configured to circumferentially and sealingly draw an inner wall of the esophagus thereagainst.

According to some embodiments, the feeding tube further includes a valve connected to the at least four vacuum lumens. According to some embodiments, the valve is configured to shift an applied vacuum between different ones of the at least four vacuum lumens, thereby varying how the inner wall of the esophagus is circumferentially and sealingly drawn.

According to some embodiments, the feeding tube further includes one or more LEDs positioned so as to illuminate a field of view of the one or more cameras.

According to some embodiments, the feeding tube further includes an air insufflation lumen.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some, or none of the enumerated advantages.

In addition to the exemplary aspects and embodiments described above, further aspects and embodiments will become apparent by reference to the figures and by study of the following detailed descriptions.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

Examples illustrative of embodiments are described below with reference to figures attached hereto. In the figures, identical structures, elements, or parts that appear in more than one figure are generally labeled with a same numeral in all the figures in which they appear. Alternatively, elements or parts that appear in more than one figure may be labeled with different numerals in the different figures in which they appear. Dimensions of components and features shown in the figures are generally chosen for convenience and clarity of presentation and are not necessarily shown in scale. The figures are listed below.

DETAILED DESCRIPTION

Figure 1:
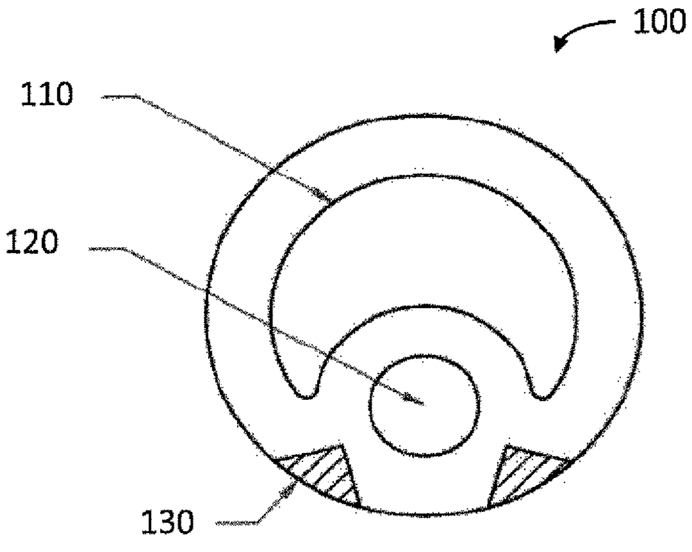
FIG. 1 schematically illustrates a front view of a feeding tube including a sensor lumen; according to some embodiments.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

According to some embodiments, there is provided an insertion tube (e.g. a feeding tube) having a main lumen (e.g. a feeding lumen for supplying substances or pressure to a subject's stomach and/or duodenum, through the esophagus); and a sensor lumen including an electromagnetic sensor. The electromagnetic sensor includes a sensor body including a core positioned at a distal end of the sensor lumen, at the tip of the insertion tube tube, and a wire extending along the length of the sensor lumen.

As used herein the term "feeding tube" may refer to gastro/enteral feeding tubes, such as, but not limited to, nasogastric feeding tubes or naso-enteral feeding tubes. According to some embodiments, the feeding tube may also be referred to as a catheter. According to some embodiments, the feeding tube may be at least 900 mm long. According to some embodiments, the feeding tube may have a length of 500-2000, 700-1800 mm or 900-1500 mm. Non-limiting examples of suitable feeding tube lengths include 910 mm and 1400 mm.

According to some embodiments, other insertion tubes/catheters such as, but not limited to endotracheal tubes, intubation tubes, and the like, which require insertion into the patient's stomach or airways may, similarly to the hereindisclosed feeding tube, likewise include the herein-disclosed electromagnetic sensor enabling it's correct and trackable insertion. Accordingly, insertion tubes including electromagnetic sensors, such has the hereindisclosed electromagnetic sensor are within the scope of this disclosure.

According to some embodiments, the sensor lumen may be a lumen configured to hold and/or receive an electromagnetic sensor. Alternatively, the lumen may refer to a compartment/enclosure formed around, melted over or otherwise making the electromagnetic sensor an integral part of the feeding tube. According to some embodiments, the sensor lumen may extend along the length of the feeding tube, along its longitudinal axis, parallel to the feeding lumen.

According to some embodiments, the feeding tube has an RF induced heating (ΔT) of below 5, below 4 degrees, below 3 degrees, below 2 degrees or below 1.5 degrees in an MRI environment using a 64 MHz RF coil. Each possibility is a separate embodiment.

According to some embodiments, the term "distal end" when referring to the sensor lumen and/or the tip of the feeding tube may refer to the last (distal most) 50 mm, the last 40 mm, the last 35 mm, the last 30, the last 25 or the last 20 mm of the feeding tube.

According to some embodiments, the term "along the length" may refer to essentially the entire length of the feeding tube, or a major part thereof.

According to some embodiments, the core comprises a coil, such as a coil made of one or more copper wires wound around at least part of the core, also referred to herein as a "core assembly". According to some embodiments, the one or more copper wire may have a diameter of between 10 μm and 70 μm. According to some embodiments, the one or more copper wires may wound around the core between 40 and 3000 turns of wire around the core. According to some embodiments, the sensor body may have an outer diameter of 1 mm or less, such as but not limited to an outer diameter of 0.8 mm.

According to some embodiments, the ends of the one or more wires wound around the core may be soldered directly or indirectly (e.g. via a soldering coil) to a printed circuit board (PCB), such as but not limited to a FR-4 PCB. According to some embodiments, the PCB may be configured to process and/or signals produced by the core in response to an electromagnetic field to an external processing device and/or monitor via the wire running through the sensor lumen. According to some embodiment, the data generated by the processing circuit are indicative of a position of the sensor and thus of the tip of the feeding tube.

According to some embodiments, the wire running along the sensor lumen may be a twisted wire, such as but not limited to a wire made of two intercalated and/or braided wires. According to some embodiments, the wire may be a pair of twisted copper wires. According to some embodiments, the wire may have an outer diameter of 0.5 mm or less, or 0.4 mm or less, such as but not limited to an outer diameter of 0.35 mm.

According to some embodiments, the feeding tube (or other insertion tube) may be flexible. According to some embodiments, the feeding tube may have a butt force (N) below 0.5 N, below 0.4 N or below 0.3 N. According to some embodiments, the feeding tube may have a butt force in the range of 0.2-0.5 N. Each possibility is a separate embodiment. As a non-limiting example, the feeding tube may be a 10 Fr naso-enteral tube having a butt force below 0.3 N. As another non-limiting example, the feeding tube may be a 12 Fr naso-enteral tube having a butt force below 0.5 N.

According to some embodiments, the feeding tube may further include one or more radiopaque markers configured to provide visibility of the feeding tube tip under CT, X-Ray, and/or fluoroscopy procedures.

According to some embodiments, the feeding may further include at least four vacuum lumens peripherally surrounding the feeding lumen and/or the sensor lumen. According to some embodiments, each of the at least four vacuum lumens include a vacuum sealing portion, the vacuum sealing portion having one or more suction ports configured to circumferentially and sealingly draw an inner wall of the esophagus thereagainst. It is understood that such configuration may seal of the esophagus and thus reduce the reflux of food and/or fluids and thus the risk of developing pneumonia resulting from inhalation of refluxed fluids and particles into the lungs. According to some embodiments, the feeding tube may further include a valve connected to the at least four vacuum lumens, and configured to shift an applied vacuum between different ones of the at least four vacuum lumens, thereby varying how the inner wall of the esophagus is circumferentially and sealingly drawn. Such varying of how the inner wall of the esophagus is circumferentially and sealingly drawn may reduce the risk of causing harm to the esophageal tissue caused by prolonged suction thereof.

According to some embodiments, there is provided an electromagnetic sensor configured for positioning within an insertion tube, the electromagnetic sensor comprising a sensor body configured to be positioned at a distal tip of the insertion tube and, and a twisted wire configured to extend along the length of the insertion tube, wherein an RF induced heating in an MRI environment of the electromagnetic sensor when positioned within the insertion tube is below 5 degrees.

According to some embodiments, the insertion tube may be a feeding tube.

According to some embodiments, the sensor body comprises a core including a coil, such as a coil made of one or more copper wires wound around at least part of the core, as essentially described herein. According to some embodiments, the one or more copper wire may have a diameter of between 10 μm and 70 μm. According to some embodiments, the one or more copper wires may wound around the core between 40 and 3000 turns of wire around the core. According to some embodiments, the sensor body may have an outer diameter of 1 mm or less, such as but not limited to an outer diameter of 0.8 mm.

According to some embodiments, the ends of the one or more wires wound around the core may be soldered directly or indirectly (e.g. via a soldering coil) to a printed circuit board (PCB), such as but not limited to a FR-4 PCB. According to some embodiments, the PCB may be configured to process and/or signals produced by the core in response to an electromagnetic field to an external processing device and/or monitor via the wire running through the sensor lumen. According to some embodiment, the data generated by the processing circuit are indicative of a position of the sensor and thus of the tip of the feeding tube.

According to some embodiments, the wire running along the sensor lumen may be a twisted wire, such as but not limited to a wire made of two intercalated and/or braided wires. According to some embodiments, the wire may be a pair of twisted copper wires. According to some embodiments, the wire may have an outer diameter of 0.5 mm or less, or 0.4 mm or less, such as but not limited to an outer diameter of 0.35 mm.

According to some embodiments, the feeding tube further includes at least one camera. According to some embodiments, the camera is positioned at the distal end of the feeding tube. According to some embodiments, the camera is positioned on the end face of the feeding tube. According to some embodiments, the camera is positioned on the wall within the lumen of the feeding tube. According to some embodiments, the camera is configured to image the path of the insertion tube during insertion. According to some embodiments, the camera is configured to image the target environment after positioning of the tube. According to some embodiments, the camera may be functionally associated with the PCB. According to some embodiments, the camera comprises a charge-coupled device (CCD) or a CMOS sensor. According to some embodiments, the camera is a fiber optic camera. According to some embodiments, the camera is visible light camera. According to some embodiments, the camera is a thermographic camera. According to some embodiments, the feeding tube and/or the camera may include one or more light sources, such as but not limited to one or more LEDs positioned so as to illuminate the field of the camera.

According to some embodiments, the processing unit may be configured to apply a machine learning algorithm on the images obtained from the one or more cameras. According to some embodiments, the applying of the machine learning algorithms enables automatic pathway recognition. According to some embodiments, the processing unit may be configured to provide instructions to the caregiver inserting the feeding tube, based on the automatic pathway recognition.

According to some embodiments, the machine learning algorithm may be trained on training sets comprising images obtained from cameras during a plurality of feeding tube insertion procedures. According to some embodiments, the training sets may be labeled (successful/unsuccessful insertion). According to some embodiments, the machine learning comprises deep learning which teaches the processer the visuals of a correct insertion based on images obtained during a plurality of insertion procedures "learning by example".

According to some embodiments, the registration of anatomic landmarks may be based on an integrated analysis of signals obtained from an electromagnetic registration sensor and the camera. According to some embodiments, the images obtained from the camera may be overlayed on one or more of X-ray, CT, US or MRI imaging of the subject's torso, obtained prior to the insertion of the feeding tube. According to some embodiments, the overlaying comprises registration of one or more anatomic landmarks based on signals and images obtained from the registration sensor and the one or more cameras.

According to some embodiments, the feeding tube may be configured for air insufflation. According to some embodiments, the feeding lumen may be reversibly coupled to an air insufflation source so as to enable air insufflation (when not used for feeding). According to some embodiments, the sensor lumen may be configured for air insufflation. According to some embodiments, the feeding tube may include an additional dedicated air sufflation lumen.

Reference is now made to FIG. 1 which schematically illustrates a front view of a feeding tube 100, according to some embodiments. Feeding tube 100 has a main, feeding lumen 110, extending along the length of feeding tube 100 through which substances or pressure may be supplied to a subject's stomach and/or duodenum. Feeding tube 100 also includes a sensor lumen 120, running parallel to feeding lumen 110 along the length of feeding tube 100. Sensor lumen 120 is configured to hold, receive, contain, and/or be formed around an electromagnetic sensor (not shown, such as sensor 300 or 400 FIG. 3 and FIG. 4 respectively). According to some embodiments, the sensor may be an integral part of feeding tube 100. Optionally, feeding tube 100 may also include radiopaque markers 130 configured to provide visibility of the feeding tube tip under CT, X-Ray, and/or fluoroscopy procedures. According to some embodiments, the feeding tube may have a butt force (N) in the range of 0.2-0.5 N, thus providing a flexibility ensuring maximal comfort to the patient while being rigid enough to facilitate guide-wire-free insertion. Feeding tube 100 further includes at least one camera 140 positioned at its distal end. Camera 140 is configured to capture images and video during insertion of the feeding tube 100. According to some embodiments, feeding tube 100 and/or the camera 140 may include one or more light sources (not shown), such as but not limited to one or more LEDs positioned so as to illuminate the field of camera 140.

According to some embodiments, feeding tube 100 may be additionally configured for air insufflation. According to some embodiments, feeding lumen 110 may be reversibly coupled to an air insufflation source (not shown) so as to enable air insufflation (when not used for feeding). According to some embodiments, sensor lumen 120 may be configured for air insufflation. Alternatively, feeding tube 100 may include an additional dedicated air sufflation lumen (not shown).

Figure 2A:
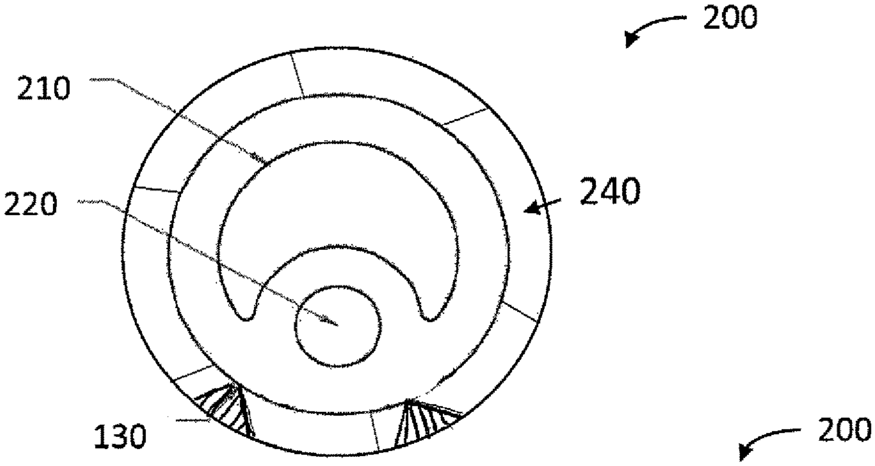
FIG. 2A schematically illustrates a front view of a feeding tube including peripheral vacuum lumens and a sensor lumen; according to some embodiments.
Figure 2B:
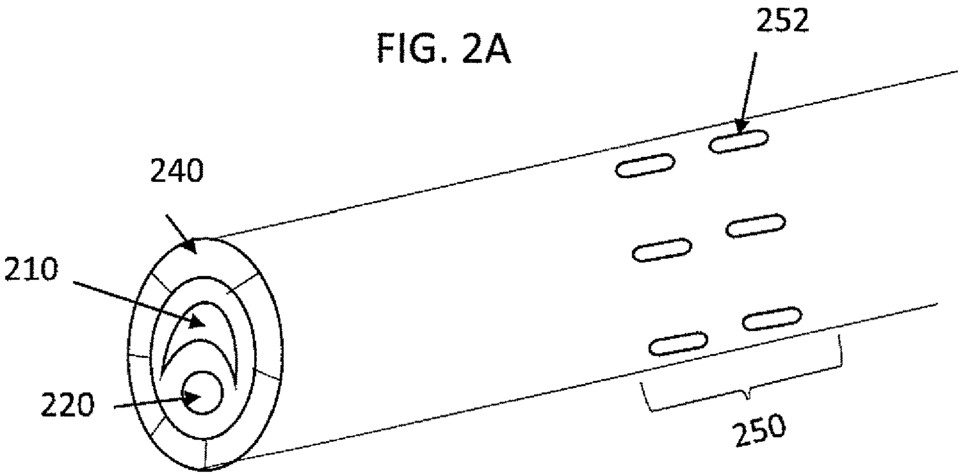
FIG. 2B schematically illustrates a perspective view of a feeding tube including peripheral vacuum lumens and a sensor lumen; according to some embodiments.

Reference is now made to FIG. 2A and FIG. 2B which schematically illustrate front and perspective views of a feeding tube 200 including peripheral vacuum lumens 240, according to some embodiments. Feeding tube 200 has a main, feeding lumen 210, extending along the length of feeding tube 200 through which substances or pressure may be supplied to a subject's stomach and/or duodenum. Feeding tube 200 also includes a sensor lumen 220, running parallel to feeding lumen 210 along the length of feeding tube 200. Sensor lumen 220 is configured to hold, receive, contain, and/or be formed around an electromagnetic sensor (not shown, such as sensor 300 or 400 FIG. 3 and FIG. 4 respectively). According to some embodiments, the sensor may be an integral part of feeding tube 200. Optionally, feeding tube 200 may also include radiopaque markers 230 configured to provide visibility of the feeding tube tip under CT, X-Ray, and/or fluoroscopy procedures. According to some embodiments, the feeding tube may have a butt force (N) in the range of 0.2-0.5 N, thus providing a flexibility ensuring maximal comfort to the patient while being rigid enough to facilitate guide-wire-free insertion. Feeding tube 200 further includes at least one camera 240 positioned at its distal end. Camera 240 is configured to capture images and video during insertion of the feeding tube 100.

Feeding tube 200 includes vacuum lumens 240 (here 6 vacuum lumens) formed peripherally around feeding lumen 210 and/or sensor lumen 220. Each of vacuum lumens 240 include a vacuum sealing portion 250 having one or more suction ports 252 (here two suction ports per vacuum lumen) configured to circumferentially and sealingly draw an inner wall of the esophagus thereagainst. It is understood that such configuration may seal of the esophagus, thereby reduce the reflux of food and/or fluids and thus the risk of developing pneumonia resulting from inhalation of refluxed fluids and particles into the lungs. According to some embodiments, the feeding tube may further include a valve (not shown) connected to vacuum lumens 240, and configured to shift an applied vacuum between different ones of vacuum lumens 240, thereby varying how the inner wall of the esophagus is circumferentially and sealingly drawn. Such varying of how the inner wall of the esophagus is circumferentially and sealingly drawn may reduce the risk of causing harm to the esophageal tissue caused by prolonged suction thereof.

According to some embodiments, one or more of vacuum lumens 240 may serve as an air insufflation lumen.

Figure 3:
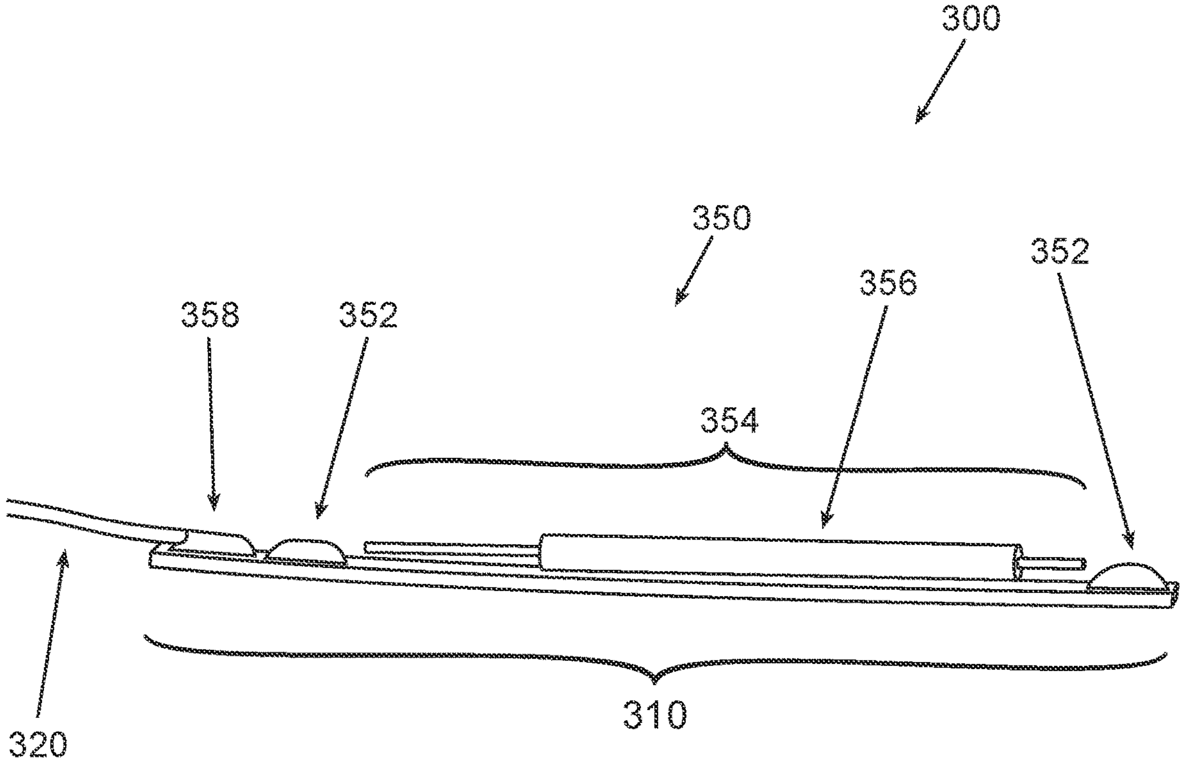
FIG. 3 shows an electromagnetic sensor configured for incorporation into a feeding tube, according to some embodiments.

Reference is now made to FIG. 3 which shows an electromagnetic sensor 300 configured for incorporation into a feeding tube according to some embodiments. Electromagnetic sensor 300 includes a PCB 310, such as but not limited to a FR4 PCB to which a sensor body 350 is soldered, for example via a soldering coil 352. Sensor body 350 includes a core 354 wrapped around which is a copper coil 356. PCB 350 may be configured to process and/or transmit signals, produced by core 356 in response to an electromagnetic field, to an external processing device and/or monitor (not shown) via a wire 320 soldered or otherwise connected to PCB 350. According to some embodiment, the data generated by PCB 350 are indicative of a position of electromagnetic sensor 300 and thus of the tip of the feeding tube (such as feeding tube 100 or 200 of FIG. 1 and FIG. 2A-B, respectively, within a patient's body. Wire 200 is a twisted wire, made of two intercalated/braided wires, which advantageously was found to cause an RF induced heating (ΔT) of below 2 degrees in an MRI environment using a 64 MHz RF coil. However, it is understood that other wires configured to have an RF induced heating (ΔT) of below 5, 4, 3 or 2 degrees in an MRI environment using a 64 MHz RF coil, may likewise be utilized. Sensor body 350 has an outer diameter of less than 1 mm and wire 320 an outer diameter of less than 0.4 mm making them suitable for incorporation into a feeding tube without causing a significant increase in the outer diameter of the feeding tube. Advantageously, by incorporating electromagnetic sensor 300 into a feeding tube, the field generator applied (not shown) may be external to the patient, thus enabling generating a larger field which is less sensitive to movement of the patient and thus of the sensor relative to the field generator. In addition, by having electromagnetic sensor 300 being an integral part of the feeding tube, re-confirmation and/or readjustment of tube position may be performed without reintroducing a stylet, which reintroducing may cause undesired movement of the feeding tube within the patient as well as cause physical harm during the procedure.

Figure 4A:
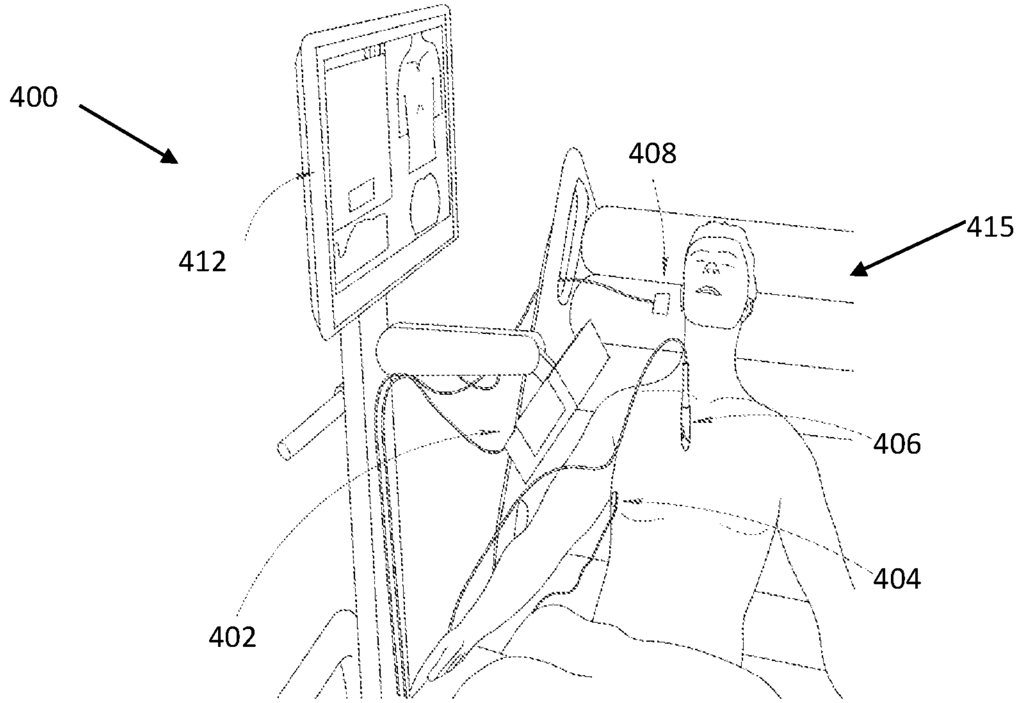
FIG. 4A schematically illustrates a feeding tube guidance system, according to some embodiments.
Figure 4B:
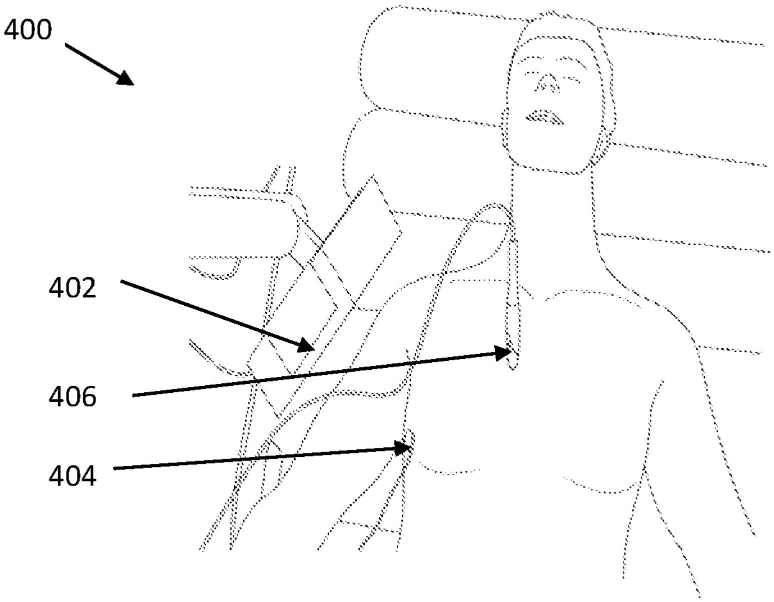
FIG. 4B shows an enlarged portion of the illustration of FIG. 4A, according to some embodiments.
Figure 4C:
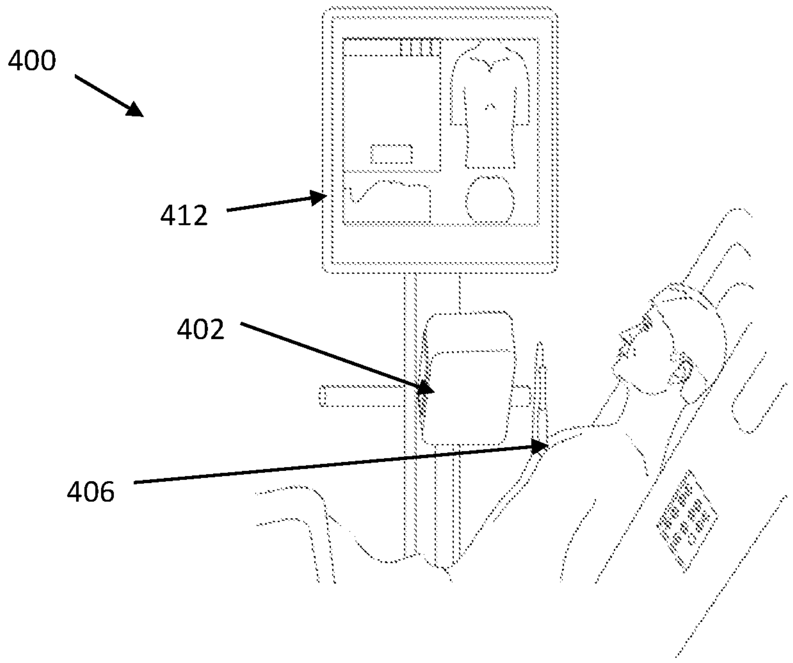
FIG. 4C shows a side view of the illustration of FIG. 4A, according to some embodiments.
Figure 4D:
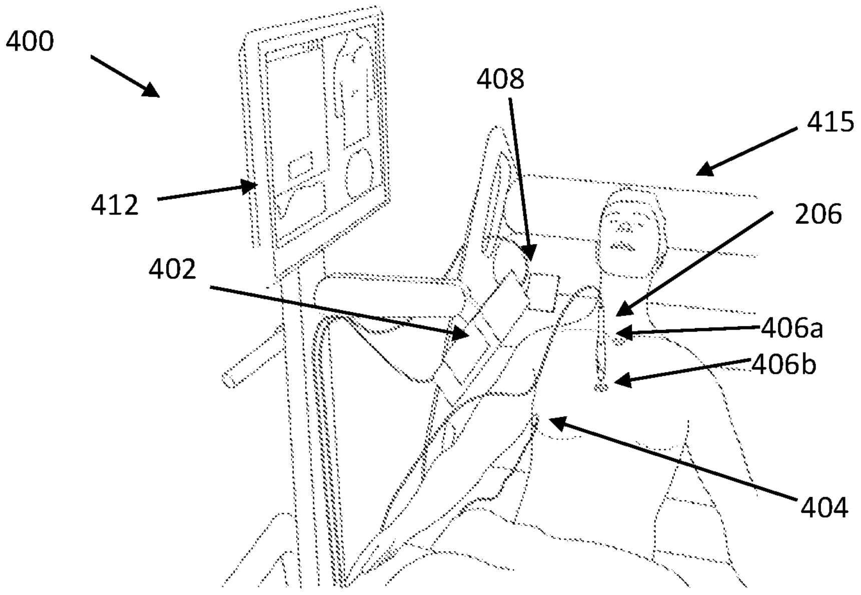
FIG. 4D schematically illustrate feeding tube guidance system depicting anatomic locations marked using a stylus, reference sensor, according to some embodiments.
Figure 4E:
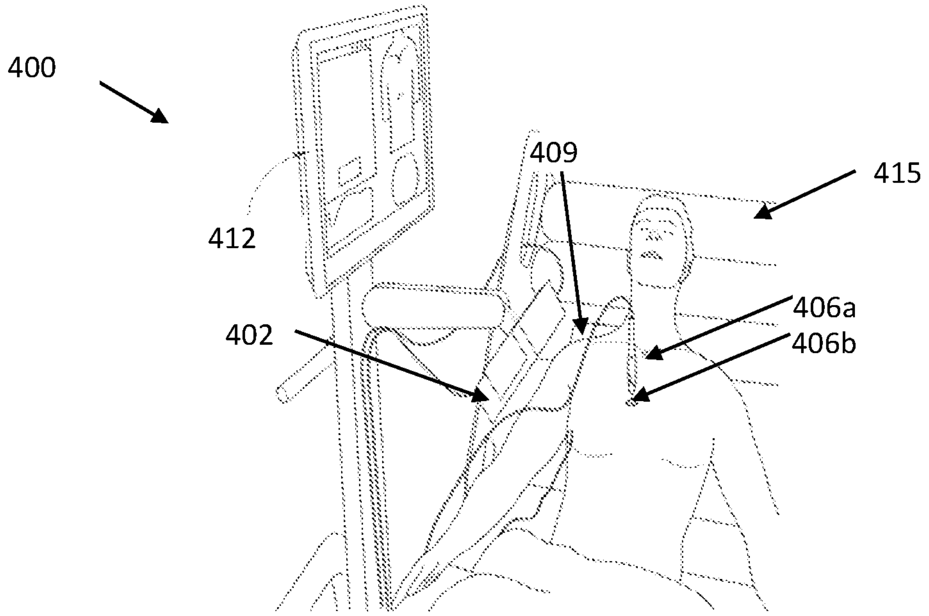
FIG. 4E schematically illustrate feeding tube guidance system depicting anatomic locations marked using a stylus, reference sensor, according to some embodiments.

Reference is now made to FIG. 4A-FIG. 4E. FIG. 4A schematically illustrates a feeding tube guidance system 400 in accordance with some embodiments, FIG. 4B shows an enlarged portion of the illustration of FIG. 4A, in accordance with some embodiments. FIG. 4C shows a side view of the illustration of FIG. 4A, and FIG. 4D FIG. 4E schematically illustrate feeding tube guidance system 400 depicting anatomic locations marked using a stylus, reference sensor, in accordance with some embodiments.

System 400 includes an electromagnetic field generator 402, and a plurality of electromagnetic sensors 404, 406, and/or 408. Further, system 400 is configured to work in conjunction with a feeding tube include an electromagnetic sensor, such as the feeding tubes 100 and 200 of FIG. 1 and FIG. 2, respectively. sensors 404, 406, and/or 408 are configured to sense and/or interfere with the electromagnetic field generated by field generator 402. Optionally, monitor 412 of system 400 is integrated with a computer, which corresponds to or includes a processor.

According to some embodiments, electromagnetic field generator 402 may be positioned at such angle and position with respect to the patient, as to enable the generated electromagnetic field to cover the external and internal working area, or optionally, the entire upper torso or an area extending from the nose to the duodenum. Reference sensor 404, and stylus sensor 406 are all configured to be positioned within the field produced by field generator 402, and once positioned and/or the patient's anatomic locations rectified, sensor 404, and stylus sensor 406 remain essentially static. The electromagnetic sensor of the feeding tube (not shown) is configured to move inside the digestive system, and its path can thus be traced. Reference sensor 404 may be attached to and/or on the skin of the patient, for example beneath the patient's armpit. Suitable means for attachment of the sensor are well known in the art such as, for example, stickers, medical glue, and the like. Reference sensor 404 may serve to detect location (XYZ axes) and attitude (roll, yaw, and pitch) of the patient with respect to field generator 402, based on the electromagnetic field (not shown) emitted by field generator 402.

Stylus sensor 406 may be manually operated to mark one or more anatomic locations over the patient's skin. For example, FIG. 4D and FIG. 4E show the marking of two such anatomic locations (indicated as "406*a*" and "406*b*" in these figures) on the patient's chest. Anatomic location 406*a* is marked over the suprasternal notch, and anatomic location 406*b* is marked over the xiphoid process. The marking may be communicated to, and registered by the computer.

Optionally, the computer receives signals of the locations and postures of reference sensor 404, and the two marked anatomic locations 406*a* and 406*b*, and computes an anatomic mark representative of the subject's torso, thereafter the medical procedure can begin. In the exemplary case of guiding the insertion of a feeding tube, the tip of the feeding tube is equipped with a sensor, such as, but not limited to sensor 300 of FIG. 3. Optionally, the computer receives the actual position and orientation of the sensors from a second processor that receives the signals and calculates the sensors' locations. Optionally, the computer receives the actual position and orientation from a second processor that receives the signals from the sensors and calculates their physical location.

System 400 is operated as follows: The electromagnetic field generator 402 is activated to apply an electromagnetic field to the treatment area, covering the subject's torso; reference sensor 404 is positioned within the treatment area, on a subject's torso, preferably on the side of the torso. Reference sensor 404 defines a reference coordinate system representing the position and orientation of the subject's torso relative to the field generator 402; registration sensor 406 is used to mark two anatomic locations on the subject's torso (for example, the suprasternal notch and the xiphoid process); utilizing a processor, generating an anatomic map representing the torso and the two anatomic locations and displaying on monitor 412 the anatomic map and the position and path of the tip sensor (of the feeding tube). The path of the tip sensor may be displayed with respect to the two anatomic locations and/or with respect to a longitudinal axis passing between the two anatomic locations and along the center of the torso. According to some embodiments, the processor is further configured to determine the location and/or path of the feeding tube using information gathered from, reference sensor 404, registration sensor 406 and images/video obtained from a camera positioned on the distal end of the feeding tube. According to some embodiments, the processor may be configured to apply a machine learning algorithm on the images (or video) obtained from the one or more cameras. According to some embodiments, the applying of the machine learning algorithms enables automatic pathway recognition. According to some embodiments, the processor may be configured to provide instructions to a caregiver inserting the feeding tube (during the insertion), based on the automatic pathway recognition.

According to some embodiments, the machine learning algorithm may be trained on training sets comprising images/video obtained from cameras during a plurality of feeding tube insertion procedures. According to some embodiments, the training sets may be labeled (successful/unsuccessful insertion). According to some embodiments, the machine learning comprises deep learning which teaches the processer the visuals of a correct insertion, based on images obtained during a plurality of insertion procedures "learning by example".

According to some embodiments, the images obtained from the camera may be overlayed on one or more of X-ray, CT, US or MRI imaging of the subject's torso, obtained prior to the insertion of the feeding tube. According to some embodiments, the overlaying comprises registration of one or more anatomic landmarks based on signals obtained from registration sensor 406 and images/video obtained from the one or more cameras.

Figure 5A:
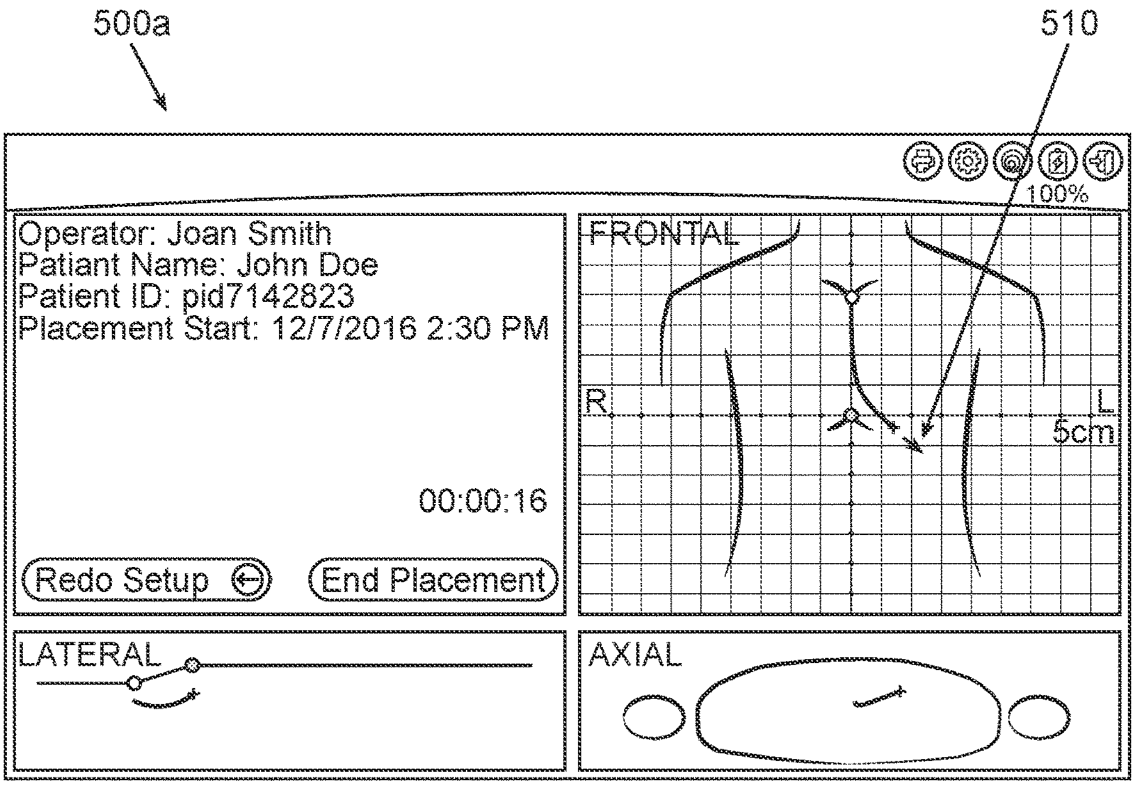
FIG. 5A shows a view of a "live" display of placement of a feeding tube, in accordance with some embodiments.
Figure 5B:
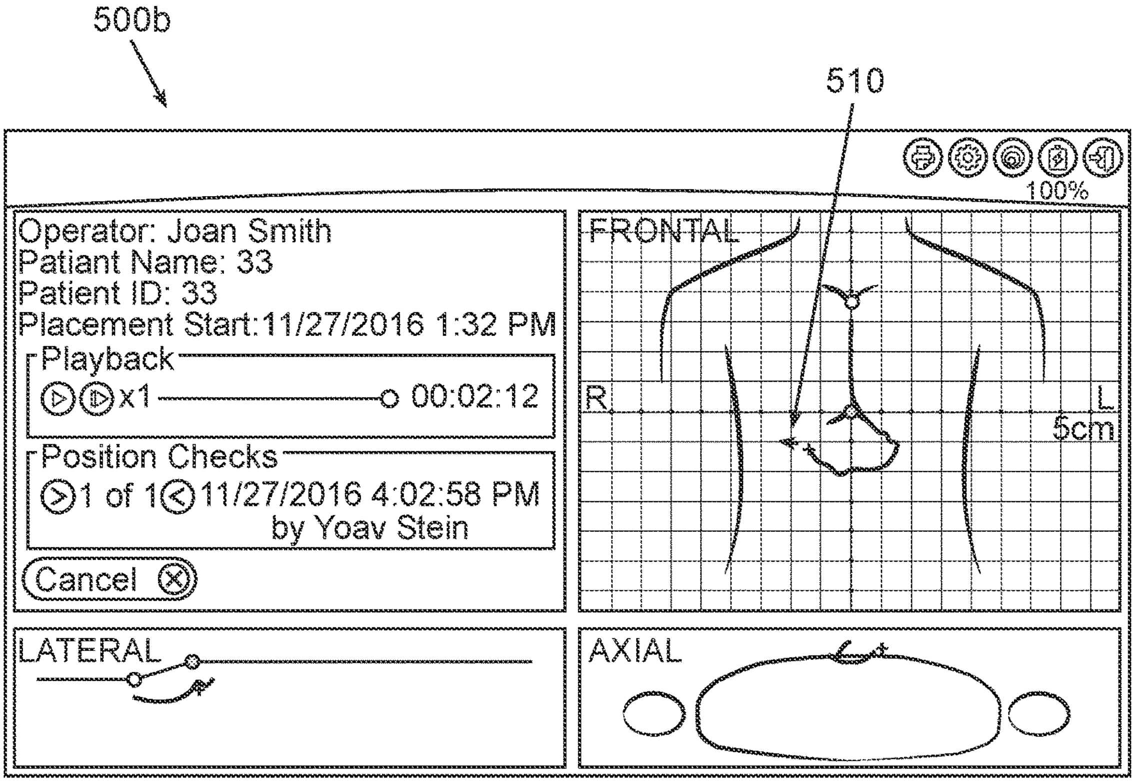
FIG. 5B shows a view of a "playback" display of placement of a feeding tube, in accordance with some embodiments.

Reference is now made to FIG. 5A, which shows a view of a "live" display 500*a* of placement of an insertion device, such as the hereindisclosed feeding tube or other insertion tube, in accordance with some embodiments and to FIG. 5B, which shows a view of a "playback" display 500*b* of placement of an insertion device, such as the hereindisclosed feeding tube or other insertion tube, in accordance with some embodiments. Such displays may be presented on a monitor such as monitor 412. The left corner of displays 500*a* and 500*b* include general information and patient's details, and display 500*b,* also playback controls.

The tip's location and path are schematically depicted, enabling the caregiver to visualize the entire insertion path of the tube, until it reaches the desired location. Optionally, and as shown in FIG. 5A and FIG. 5B, an arrow 510 may indicate the actual direction to which the tube is pointing and/or its path. Arrow 510 may help the user to properly insert the tube and/or better understand where and to which direction the tube is moving. According to some embodiments, the arrow may be colored so as to indicate/suggest whether the insertion tube is assuming a correct path. For example, during insertion of a feeding tube, a green colored arrow may indicate/suggest to the user that the feeding tube is moving towards the patient's stomach as intended, whereas a red colored arrow may indicate/suggest that the feeding tube is moving in the direction of the lungs.

The displays of both FIG. 5A and FIG. 5B here depict three views of the patient's body: a frontal view shown at the top right side of the monitor, a lateral view shown at the bottom left side of the monitor, and an axial view shown at the bottom right side of the monitor. In some embodiments, different and/or additional views may be shown. In some embodiments, only a subset of the views may be depicted, such as only a frontal view, only a frontal and a lateral view, or a frontal and an axial view.

The caregiver inserting the insertion medical device can view the indications on monitor 412 while manually maneuvering the medical implement into the patient's body, so as to guide it to the desired location in the body.

EXAMPLES

Example 1

Low RF Induced Heating Under MRI 1.5T System

The RF induced heating for the hereindisclosed catheters at two different lengths (1400 mm and 910 mm) was investigated under Magnetic Resonance Imaging (MRI) at 1.5T. The transfer function approach was used in the investigation. The clinically relevant pathways were developed on the Duke model (with additional 2 mm shifts in all six directions). The incident fields along these pathways were extracted and integrated with the developed transfer functions to estimate the RF induced heating under these environments.

This testing was performed in accordance with ISO/TS 10974 Section 10: Protection from harm to the patient caused by RF-induced heating. Step 1 of the test involved: ASTM phantom simulations performed with the catheter in the different orientations to get the simulated tangential E-field (Esim/Etan). Step 1a involved obtaining simulated tangential E field values for anatomical body simulations. Step 2a involved identifying the hot spots near the tip of the device. Step 2 involved current distribution profile or transfer function along the catheter path (Tf). Step 3 involved measurement of temperature rise for relevant pathways in muscle simulating gel and air, in ASTM phantom inside the RF coil. Step 4 involved computing the scaling factor for the transfer function (C). Step 5 involved validating the transfer function. Step 6 included computing the temperature rise in human models by combining the Etan values simulated in step la with the transfer function scaling factor calculated in Step 4 and the transfer function Tf measured in Step 2.

Figure 6:
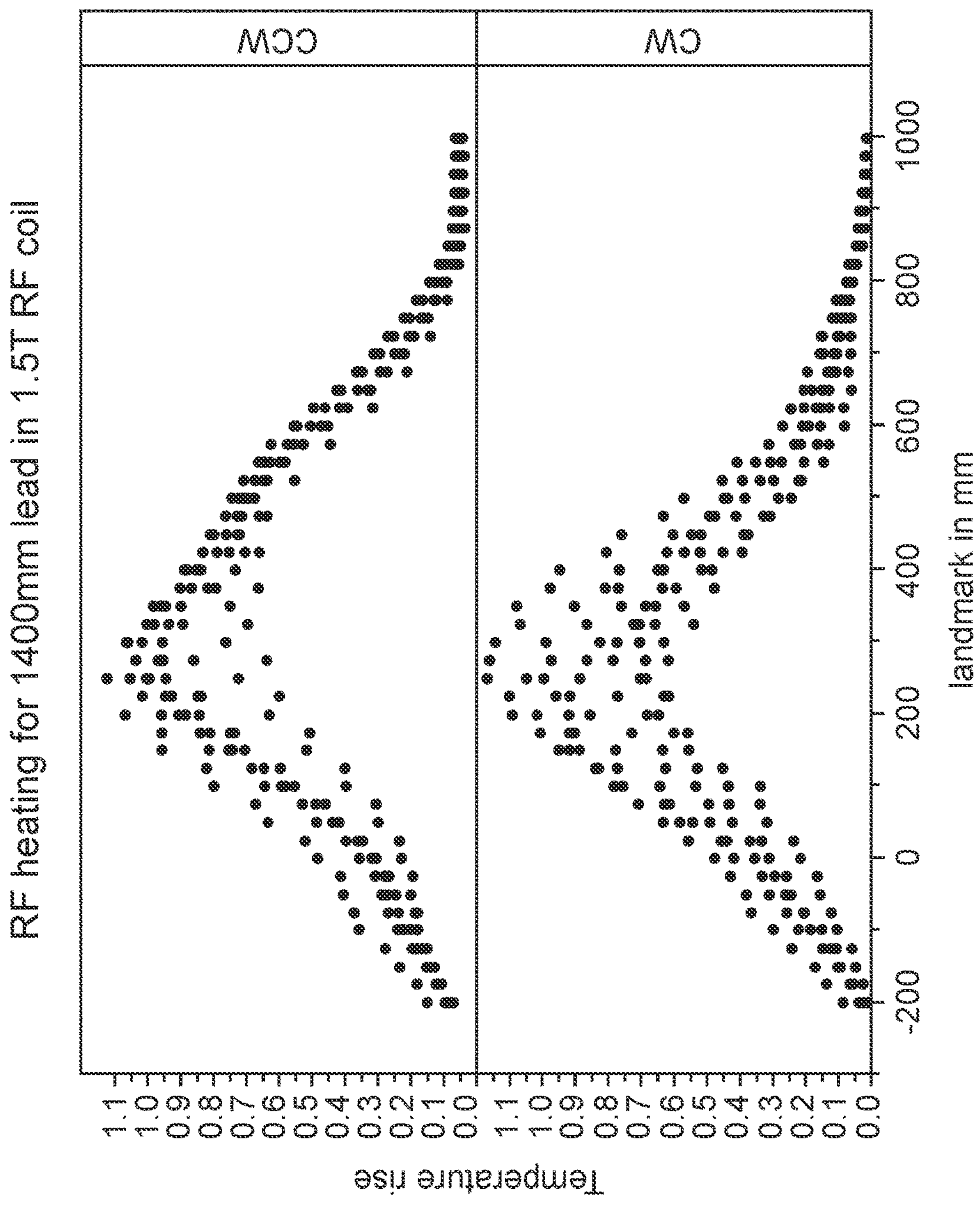
FIG. 6 shows RF induced heating measured near the catheter tip of a 1400 mm feeding tube with electromagnetic sensor with 2 mm shift in all six directions.
Figure 7:
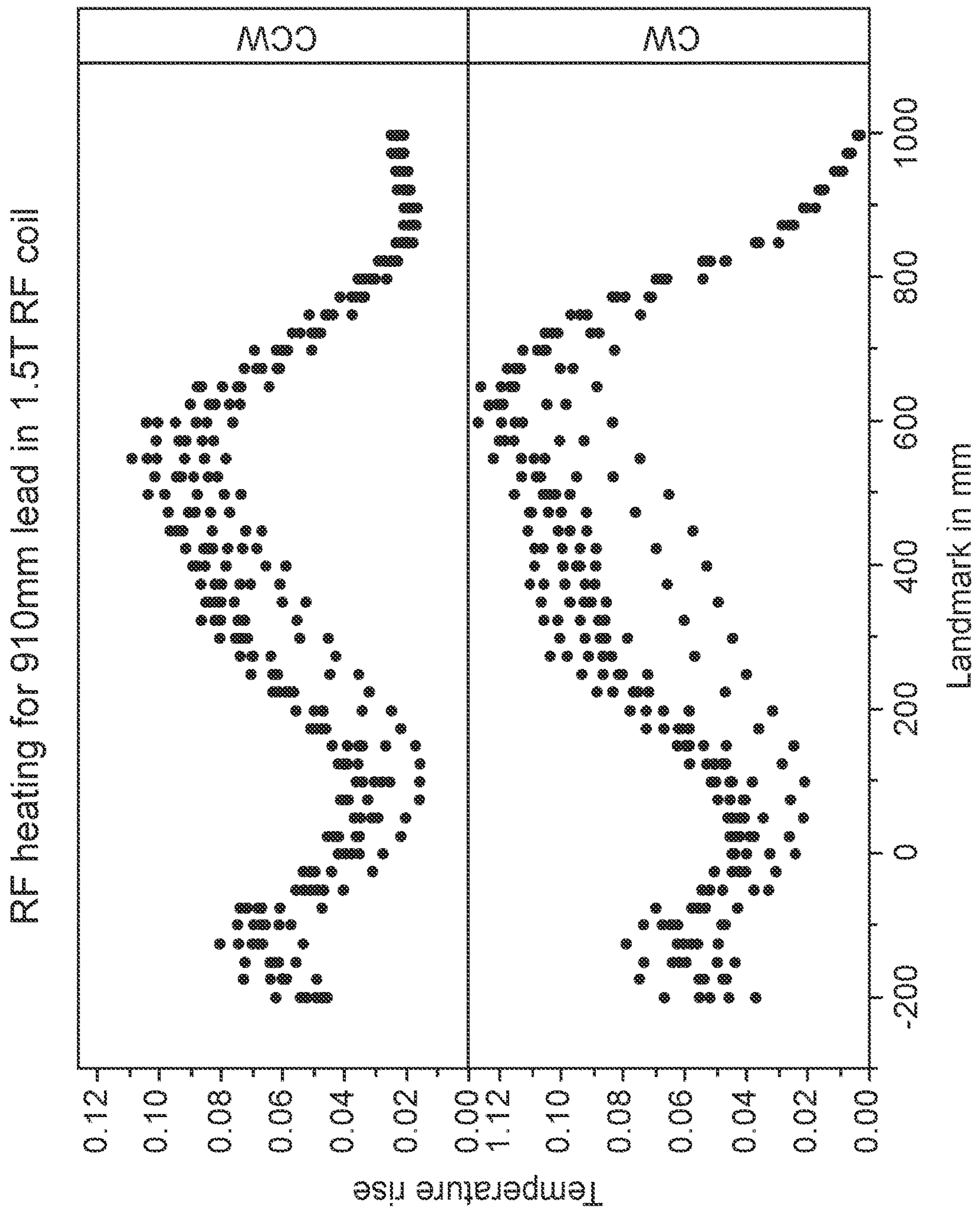
FIG. 7 shows RF induced heating measured near the catheter tip of a 910-mm feeding tube with electromagnetic sensor with 2 mm shift in all six directions.

The RF induced heating near the worst-case heating spot for the 1400 mm and 910 mm catheters are shown in FIG. 6 and FIG. 7. The x-axis corresponds to different landmark position (loading position of human body inside the RF coil). Both clockwise and counter-clockwise polarizations were considered (this corresponds to foot load in first or head load in first position).

As seen from these figures, the RF induced heating measured for the catheters was extremely low (less than 2 degrees Celsius).

Example 2

Low Butt Force

Butt force testing was performed on the hereindisclosed naso-enteral feeding tube with electromagnetic sensor, as essentially disclosed in FIG. 1. 10 Fr and 12 Fr tubes were tested using a FG-5000A Force Gauge rom Lutron Electronic Enterprise CO and a FS-1001 Force Gauge Test Stand from Lutron Electronic Enterprise CO. The feeding tubes were attached to the force gauge, while ensuring that the tube was straight, and the tip was against the base.

The wheel of the test stand was turned to pull the tip down and monitor the force readout on the gauge. The max force readout was measured, and the test repeated for a total of 8 samples of selected tube and a mean butt force (5) calculated.

A mean butt force of 0.28 N±0.05 was measured for the 10 Fr feeding tube and a mean butt force of 0.42 N±0.05 was measured for the 12 Fr feeding tube.

Advantageously the measured butt force, of the herein disclosed feeding tubes, provides a flexibility ensuring maximal comfort to the patient, while being rigid enough to facilitate guide-wire-free insertion.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, or components, but do not preclude or rule out the presence or addition of one or more other features, integers, steps, operations, elements, components, or groups thereof.

Unless specifically stated otherwise, as apparent from the following discussions, it is appreciated that throughout the specification discussions utilizing terms such as "processing", "computing", "calculating", "determining", "estimating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

While a number of exemplary aspects and embodiments have been discussed above, those of skill in the art will recognize certain modifications, additions and sub-combinations thereof. It is therefore intended that the following appended claims and claims hereafter introduced be interpreted to include all such modifications, additions and sub-combinations as are within their true spirit and scope.

The invention claimed is:

1. A feeding tube comprising:

a feeding lumen for supplying substances or pressure to a subject's stomach and/or duodenum, through the esophagus; and a sensor lumen, an electromagnetic sensor comprising:

a sensor body comprising a core positioned at a distal end of said sensor lumen, and a wire extending along the length of the sensor lumen, a camera positioned at a distal end of the feeding tube, wherein an RF induced heating of said feeding tube in an MRI environment is below 5 degrees Celsius.

2. The feeding tube of claim 1, wherein said electromagnetic sensor body further comprises a printed circuit board (PCB).

3. The feeding tube of claim 2, wherein said sensor core and said wire are directly or indirectly attached to said PCB.

4. The feeding tube of claim 2, wherein said PCB is a FR-4 PCB.

5. The feeding tube of claim 1, wherein said wire is twisted.

6. The feeding tube of claim 5, wherein said twisted wire comprises two intercalated wires.

7. The feeding tube of claim 1, wherein the RF induced heating of said feeding tube in an MRI environment is below 3 degrees Celsius.

8. The feeding tube of claim 1, wherein the RF induced heating of said feeding tube in an MRI environment is below 2 degrees Celsius.

9. The feeding tube of claim 1, wherein the RF induced heating of said feeding tube in an MRI environment is below 1.5 degrees Celsius.

10. The feeding tube of claim 1 having a butt force (N) in the range of 0.2-0.5 N.

11. The feeding tube of claim 1, being at least 900 mm long.

12. The feeding tube of claim 1, having a length of 900-1400 mm.

13. The feeding tube of claim 1, further comprising a radiopaque marker.

14. The feeding tube of claim 5, wherein the twisted wire has an outer diameter of 0.5 mm or less.

15. The feeding tube of claim 5, wherein the twisted wire has an outer diameter of 0.4 mm or less.

16. The feeding tube of claim 1, wherein the sensor body has an outer diameter of 1 mm or less.

17. The feeding tube of claim 1, further comprising one or more LEDs positioned so as to illuminate a field of view of the camera.

18. The feeding tube of claim 1, further comprising an air insufflation lumen.

* * * * *